(12) United States Patent
Chen

(10) Patent No.: US 7,187,477 B2
(45) Date of Patent: Mar. 6, 2007

(54) IMAGE SCANNING APPARATUS WITH SPEED-CHANGE GEAR MODULE

(75) Inventor: Sheng-Kao Chen, Hsinchu (TW)

(73) Assignee: BenQ Corporation, Taoyuan (TW)

( * ) Notice: Subject to any disclaimer, the term of this patent is extended or adjusted under 35 U.S.C. 154(b) by 867 days.

(21) Appl. No.: 10/317,976

(22) Filed: Dec. 12, 2002

(65) Prior Publication Data
US 2003/0112477 A1    Jun. 19, 2003

(30) Foreign Application Priority Data
Dec. 19, 2001  (TW) ............................... 90131451 A

(51) Int. Cl.
  *H04N 1/36*    (2006.01)
  *H04N 1/04*    (2006.01)
  *F16H 3/34*    (2006.01)
(52) U.S. Cl. ...................... 358/412; 358/414; 358/486; 74/354
(58) Field of Classification Search ................ 358/412, 358/497, 414, 486; 74/354
See application file for complete search history.

(56) References Cited

U.S. PATENT DOCUMENTS 6,115,149 A * 9/2000 Lai et al. .................... 358/505
6,236,472 B1 * 5/2001 Tsai ........................... 358/487
6,244,124 B1 * 6/2001 Lee ............................ 74/354

\* cited by examiner

*Primary Examiner*—Twyler Lamb
*Assistant Examiner*—Houshang Safaipour
(74) *Attorney, Agent, or Firm*—Snell & Wilmer L.L.P.

(57) ABSTRACT

The present invention relates to an image scanning apparatus having a scanning module, a transmission belt, a speed-change gear module, and a driving device. The driving device drives the transmission belt by using the speed-change gear module so as to drive the scanning module positioned on the transmission belt to scan an image. The speed-change gear module provides various speed-change ratios so that the driving device may drive the transmission belt at different speeds under the same speed of the driving device. In the embodiment, the speed-change gear module has a switching platform for accommodating the speed-change gear module. The stepping motor serving as the driving device is connected with the speed-change gear module by the motor gear. The transmission belt is connected with the speed-change gear module by the belt wheel. When moving or rotating the switching platform to switch between the deceleration ratios, a first set of deceleration gear and a second set of deceleration gear selectively engages with a motor gear.

12 Claims, 6 Drawing Sheets

IMAGE SCANNING APPARATUS WITH SPEED-CHANGE GEAR MODULE

This application claims priority of Taiwan Patent Application No. 090131451 filed on Dec. 19, 2001.

1. Field of Invention

The present invention relates to an image scanning apparatus. Particularly, various aspects of the present invention relate to an image scanning apparatus with a speed-change gear module.

2. Background of the Invention

Image scanning [0003.1] apparatus are widely used computer peripheral devices. Usually, the image scanning apparatus, also known as scanners, include types of flat-bed scanners and palm-size scanners. The data on paper, such as pictures, texts, graphs and so on, are converted into electrical files by the scanners. Then the electrical files may be stored in computers or processed by other electrical apparatus. Many scanners provide multiple scanning resolutions to be selected by users. The scanning resolution is the number of the image dots per unit length in the scanning module of the scanners. Generally, the unit of the resolution is dot per inch (dpi). For example, 250 dpi stands for 250 image dots per inch the scanners generate while scanning documents.

Please refer to FIG. 1. FIG. 1 is a schematic illustration of a part of prior flat-bed scanners. The flat-bed scanner includes a stepping motor 11, a motor gear 121, a first speed-change gear 122, a second speed-change gear 123, a third speed-change gear 124, a belt wheel 125, a transmission belt 14, and a scanning module 13 disposed on the transmission belt 14. The stepping motor 11 and the motor gear 121 are coaxial. The first speed-change gear 122 and the second speed-change gear 123 are coaxial. The third speed-change gear 124 and the belt wheel 125 are coaxial. Besides, the motor gear 121 engages with the first speed-change gear 122. The second speed-change gear 123 engages with the third speed-change gear 124. The belt wheel 125 engages with the transmission belt 14. Because of the interconnection among the gears 121, 122, 123,124, and 125, the stepping motor 11, which is used as the driving device, drives the transmission belt 14 to move the scanning module 13 to scan.

The stepping motor 11 having a specified rotating speed can drive the scanning module 13 at a designed speed by (a) utilizing the interconnection between the gears 121, 122, 123, 124, 125 in FIG. 1 and by (b) changing the radius and/or number of teeth of each gear during design stage. Since the scanning operation is performed by the scanning module 13 moving at a speed, the scanning module 13 has to move at various speeds in order to meet requirements of multiple scanning resolutions, respectively. Because the radiuses and the number of teeth of the gears 121, 122, 123, 124, 125 are predetermined in the design stage, if the moving speed of the scanning module 13 needs to be adjusted, the rotation speed of the stepping motor 11 has to be adjustable during scanning operation. In other words, the stepping motor 11 has to be operated at different rotation speeds in order to get different scanning resolutions. However, the stepping motor 11 is not suitable for operating at various rotation speeds. For example, a common problem with the stepping motor is that the torque force of the stepping motor 11 will not be enough if the rotation speed of the stepping motor 11 is higher than a specified speed. Therefore, because of the insufficient torque force of the stepping motor, the scanning time still cannot be substantially reduced, even if the scanning resolution is set low.

SUMMARY OF THE INVENTION

Therefore, in order to overcome the problem of the prior art, the present invention provides an image scanning apparatus having a speed-change gear module. When the scanning is performed at a low resolution, the output torque force can be increased to reduce the scanning time.

One aspect of the present invention is providing an image scanning apparatus for selectively providing different deceleration ratios corresponding to a high resolution scanning and a low resolution scanning.

The present invention provides an image scanning apparatus having a driving device, a transmission belt, a scanning module and a speed-change gear module. The scanning module is disposed on the transmission belt. The speed-change gear module is connected to the driving device and the transmission belt. The driving device indirectly drives the transmission belt that is connected with the speed-change gear module, so the directing device drives the scanning module to perform the scanning operation.

The internal configuration of the speed-change gear module can be selectively changed so as to change the deceleration ratio. Therefore, the driving device, at an identical rotation speed, can input power into the speed-change gear module and drive the transmission belt at various speeds.

One preferred embodiment of the present invention provides two different deceleration ratios. The speed-change gear module has a driving gear set, a belt gear set, a first set of deceleration gear, a second set of deceleration gear and a switching platform. The first set of deceleration gear and the second set of deceleration gear are positioned on the switching platform. One of the first set of deceleration gear and second set of deceleration gear is selected to engage with both the driving gear set and the belt gear set by moving or rotating the switching platform. The driving gear set is connected to and rotates with the driving device, the belt gear set is connected to and drives the transmission belt, so the deceleration ratio may be varied when different deceleration gear is engaged with the driving gear set and the belt gear set.

Therefore, while the driving device, such as a stepping motor, inputs power into the speed-change gear module at an identical speed, the invention drives the transmission belt at different speeds by selecting various sets of deceleration gear. The present invention not only satisfies the requirement of various scanning resolutions, but also resolves the problem of insufficient torque force of the stepping motor at a high rotation speed.

This and other aspects of the present invention will become clear to those of ordinary skill in the art after having read the following detailed description of the preferred embodiment which is illustrated in the various figures and drawings.

DETAILED DESCRIPTION

Figure 1:
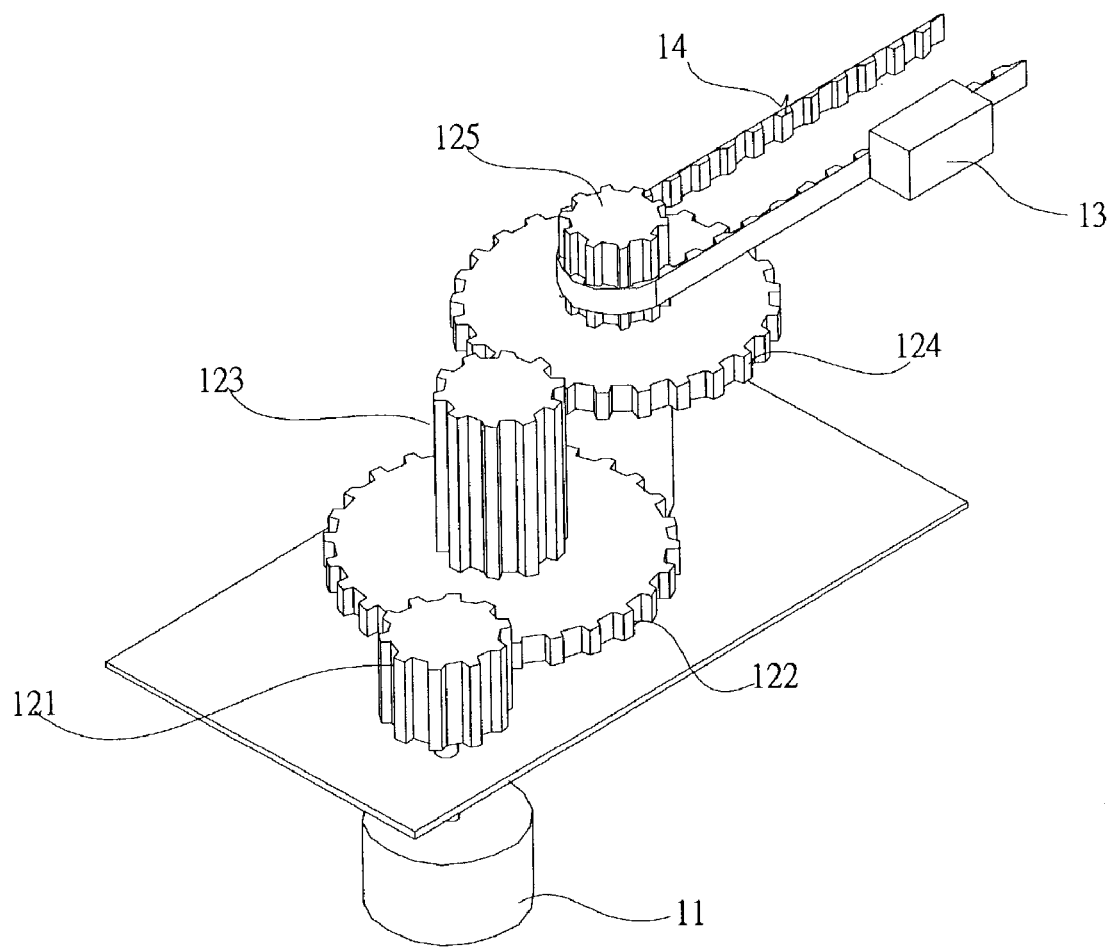
FIG. 1 illustrates a portion of a prior art flat bed scanner.
Figure 2:
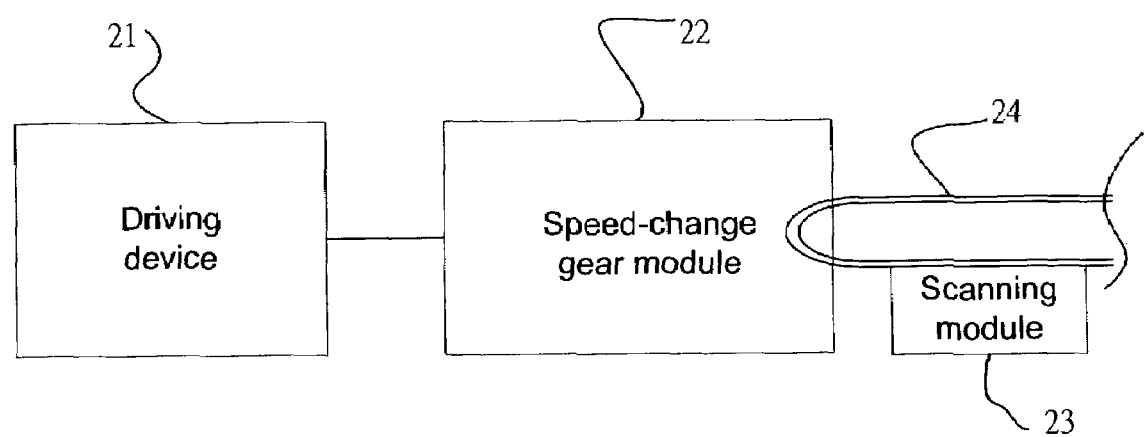
FIG. 2 shows a block diagram of an embodiment according to the present invention.

Please refer to FIG. 2. FIG. 2 is a block diagram of an image scanning apparatus according to an exemplary embodiment of the present invention. The image scanning apparatus includes a driving device 21, a speed-change gear module 22, a scanning module 23 and a transmission belt 24. The driving device 21 is connected to the speed-change gear module 22 for driving the transmission belt 24, and the transmission belt 24 is also connected to the speed-change gear module 22. The speed-change gear module 22 can be configured into various engagement relationships among the sets of deceleration gear therein such that the configuration corresponding to a high resolution is obtained when the scanner scans a high resolution original, and vice versa. The scanning module 23 is disposed on the transmission belt 24. When the transmission belt 24 is driven, the scanning module 23 will move to perform scanning under users' control.

One of many engagement relationships among the sets of deceleration gear corresponding to different resolutions may be selected to obtain a desired deceleration ratio of the speed-change gear module 22. While the driving device 21 inputs power into the speed-change gear module 22 at an identical speed, the invention drives the transmission belt 24 at different speeds by selecting appropriate set of deceleration gear. Therefore, different moving speeds of the scanning module 23 are selectively obtained.

Based on requirements of various scanning resolutions, the scanning module 23 performs scanning at various speeds. For example, when scanning at a high resolution, the scanning module 23 has to scan the image at a lower speed. Alternatively, when scanning at a low resolution, the scanning module has to scan the image at a higher speed. Therefore, the scanning module 23 can move at different speeds, without changing the speed of the driving device 21 by adjusting the configuration inside the speed-change gear module 22.

In this preferred embodiment, the driving device 21 may be a stepping motor. Generally, the stepping motor produces insufficient torque force when rotating at a high rotation speed. Therefore, the speed-change gear module 22 is provided in the invention to adjust the moving speed of the scanning module 23. This invention not only resolves the problem of insufficient torque force of the stepping motor, but also substantially reduces the scanning time when scanning images at a low resolution.

It should be noted that the scanning module 23 may be a module composed by scanning elements, such as charge coupled devices (CCD) or contact image sensors (CIS).

Figure 3A:
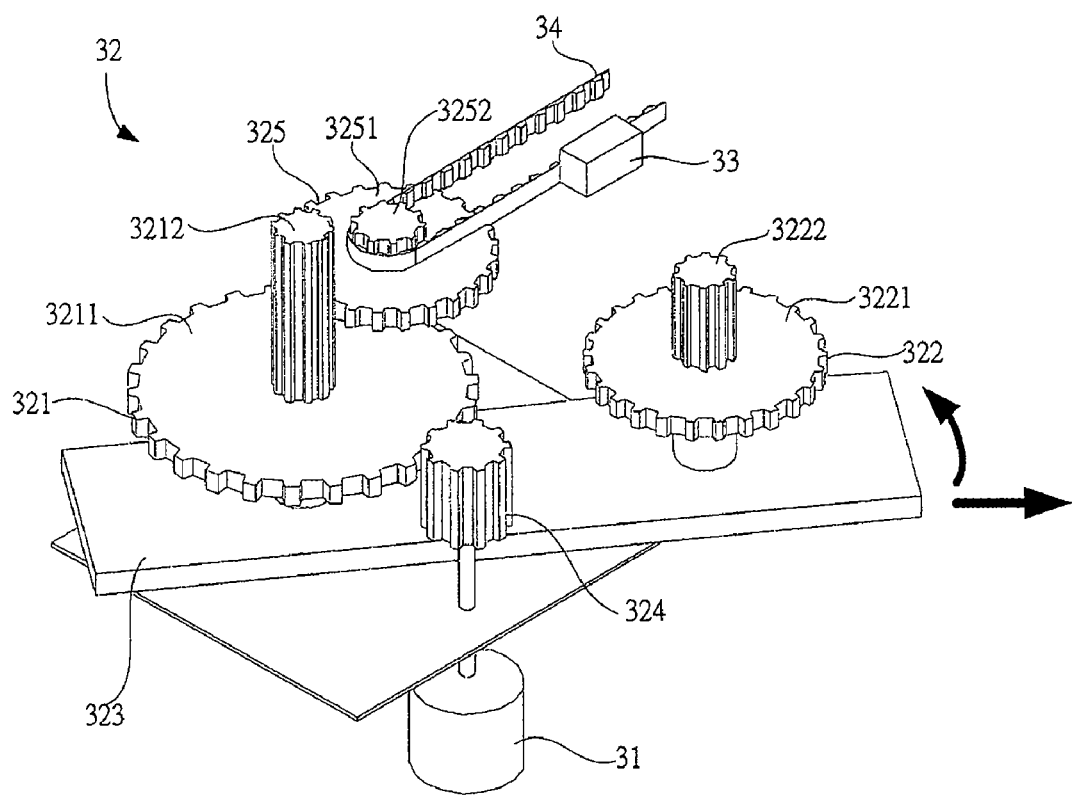
FIG. 3A shows a perspective view of the embodiment in a first configuration.
Figure 4A:
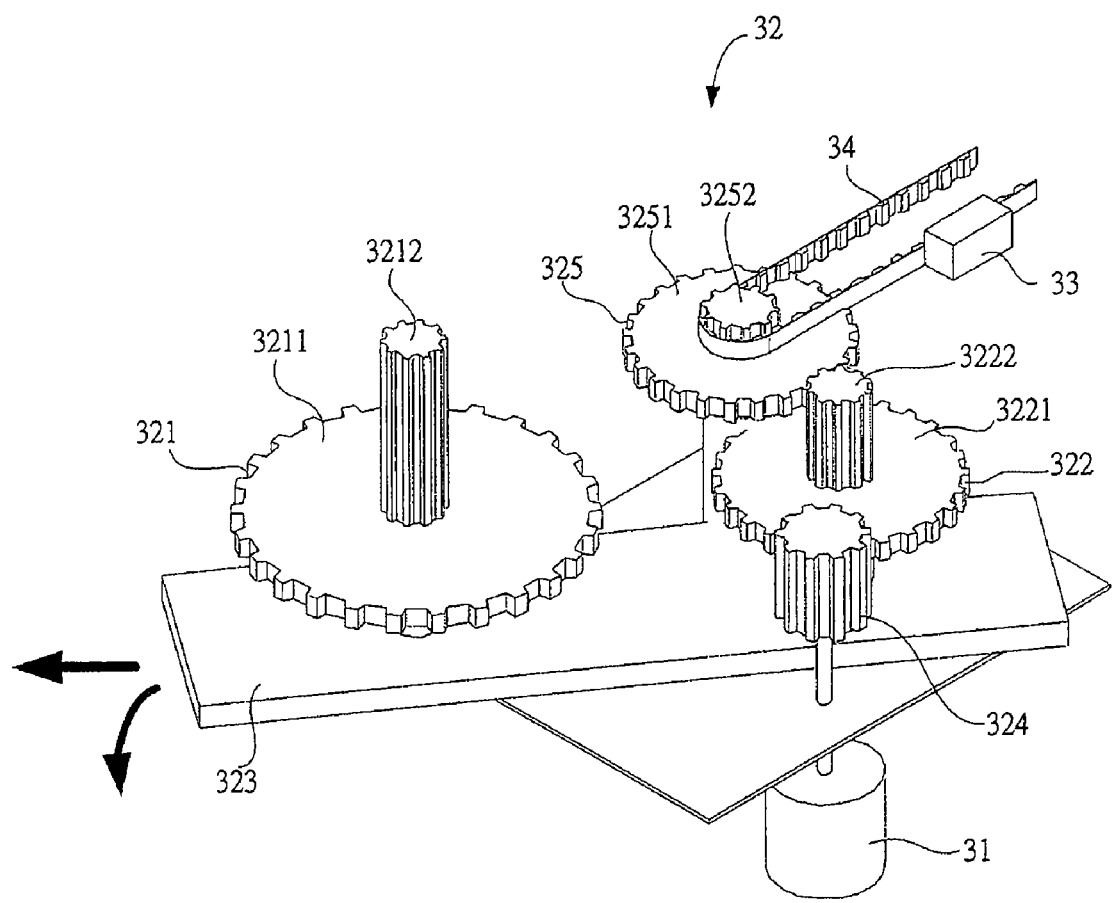
FIG. 4A shows a perspective view of the embodiment in a second configuration.

The speed-change gear module 22 may be practiced by various mechanisms or combinations of speed-change gears. The configurations of the speed-change gear module 22 can be changed as shown in FIG. 3a and FIG. 4a. Two different configurations of the speed-change gear module 22 are selected to obtain, by shifting or rotating the internal driving platform, so that different deceleration gears are engaged with each other to achieve two different deceleration ratios. Therefore, the resolution of the image scanning apparatus can be adjusted. In the present embodiment, for the configuration 1, the resulting solution is 600 dpi. The resulting resolution is 2400 dpi for the configuration 2.

In order to describe the possible structure of the speed-change gear module 22, FIGS. 3A, 3B, 4A and 4B are referred to disclose a preferred embodiment of the speed-change gear module 22 having two deceleration ratios.

Please refer to FIGS. 3A, 3B, 4A and 4B. In this embodiment, the image scanning apparatus has a stepping motor 31 as a driving device, a speed-change gear module 32, a scanning module 33 and a transmission belt 34. The scanning module 33 is positioned on the transmission belt 34. The speed-change gear module 32 has a first set of deceleration gear 321, a second set of deceleration gear 322, a switching platform 323, a motor gear 324 as a driving gear set, and a belt gear set 325.

It should be noted that, in this embodiment, only one motor gear 324 is connected with and rotates with the stepping motor 31 to receive the power from the stepping motor 31. However, a similar result can be achieved by equivalent connection of multiple gears by persons skilled in the art.

Additionally, in this embodiment, the belt gear set 325 has a belt gear 3251 and a coaxial belt wheel 3252. The transmission belt 34 is driven via the connection of the belt wheel 3252 to the transmission belt 34. However, multiple equivalent gears achieving same result are also intended protection scope of the invention.

The first set of deceleration gear 321 has a first input gear 3211 and a first output gear 3212. The first input gear 3211 and the first output gear 3212 are coaxial. Number of teeth of the first input gear 3211 is larger than the number of teeth of the first output gear 3212.

Figure 3B:
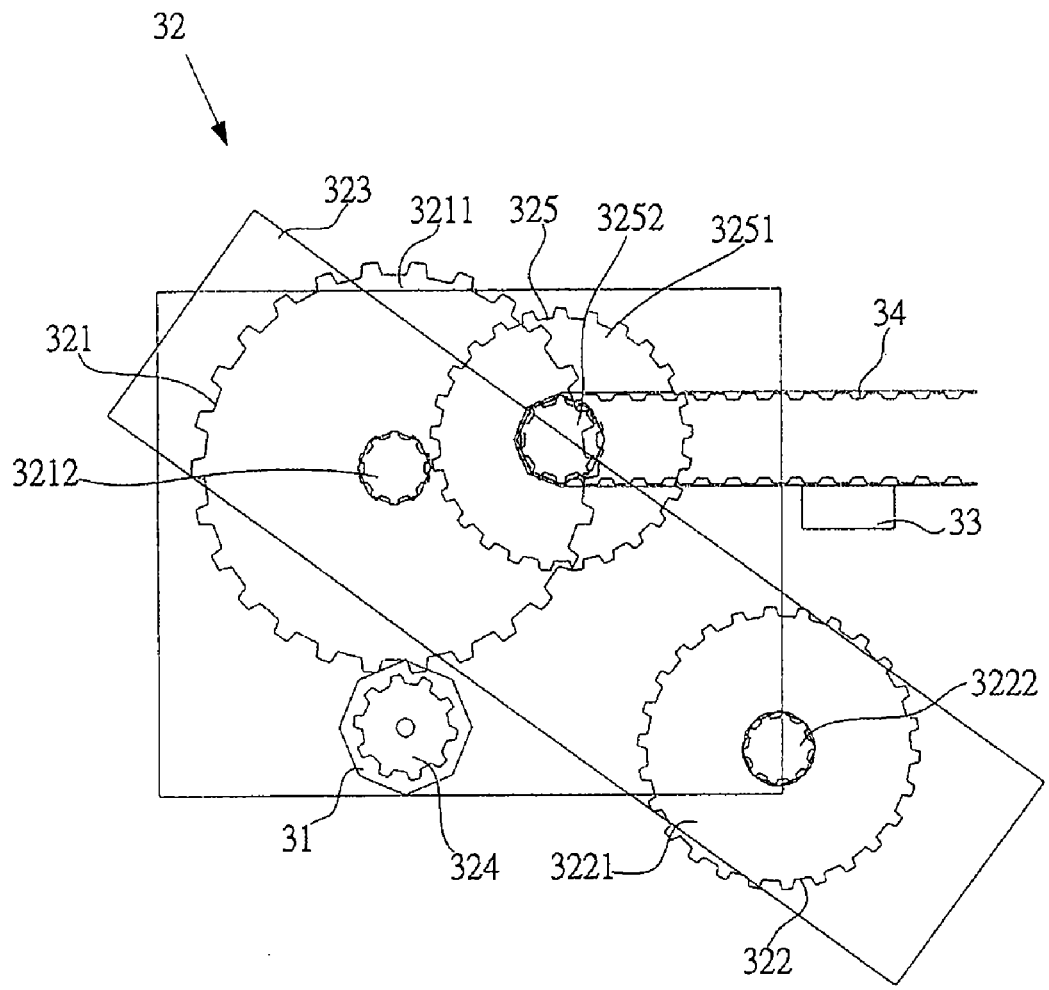
FIG. 3B shows a top view of the embodiment in the first configuration.

In FIGS. 3A and 3B showing the configuration 1, the first input gear 3211 engages with the motor gear 324. At the same time, the first output gear 3212 engages with the belt gear 3251. When the stepping motor 31 starts rotating, the motor gear 324 is driven first. Then, the motor gear 324 drives the first input gear 3211, and the first input gear 3211 subsequently drives the first output gear 3212. In succession, the first output gear 3212 drives the belt gear 3251, and the belt gear 3251 drives the belt wheel 3252. Finally, the belt wheel 3252 drives the transmission belt 34 to move the scanning module 33.

In this embodiment, the first set of deceleration gear 321 and the second set of deceleration gear 322 are positioned on the switching platform 323. When the switching platform 323 is moved or rotated from configuration 1 shown in FIGS. 3A and 3B to configuration 2 shown in FIGS. 4A and 4B, the second set of deceleration gear 322 is moved to engage with the motor gear 324 and the belt gear 3251.

The second set of deceleration gear 322 has a second input gear 3221 and a second output gear 3222. The second input gear 3221 and the second output gear 3222 are coaxial. Number of teeth of the second input gear 3221 is larger than the number of teeth of the second output gear 3222.

Figure 4B:
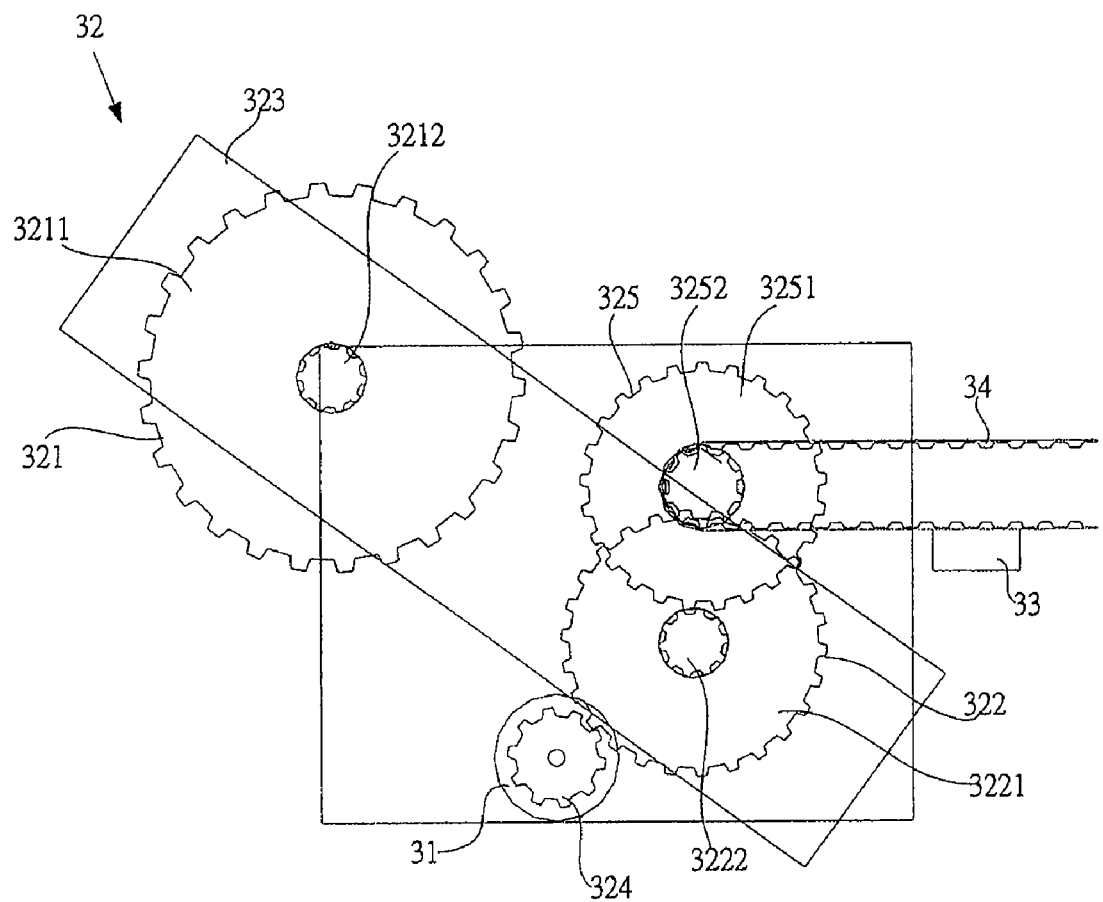
FIG. 4B shows a top view of the embodiment in the second configuration.

When the switching platform 323 is moved to the configuration 2, as shown in FIGS. 4A and 4B, the second input gear 3221 engages with the motor gear 324. At the same time, the second output gear 3222 engages with the belt gear 3251. When the stepping motor 31 starts rotating, the motor gear 324 is driven first. Then, the motor gear 324 drives the second input gear 3221, and the second input gear 3221 subsequently drives the second output gear 3222. In succession, the second output gear 3222 drives the belt gear 3251, and the belt gear 3251 drives the belt wheel 3252. Finally, the belt wheel 3252 drives the transmission belt 34 so that the scanning module 33 starts moving.

Assume number of teeth of the motor gear 324 is 10, number of teeth of the first input gear 3211 is 40, number of teeth of the first output gear 3212 is 10, and number of teeth of the belt gear 3251 is 60. In the configuration 1 of FIGS. 3A and 3B, the deceleration ratio of the speed-change gear module 32 is: (40/10)*(60/10)=24. Assume number of teeth of the second input gear 3221 is 20, number of teeth of the second output gear 3222 is 10. In the configuration 2 of FIGS. 4A and 4B, the deceleration ratio of the speed-change gear module 32 is: (40/20)*(60/10)=12.

In other words, the numbers of teeth of the first input gear 3211, the first output gear 3212, the second input gear 3221 and the second output gear 3222 may be altered during design phase to obtain different deceleration ratios. Even though the stepping motor 31 provides power at an identical rotation speed, the transmission belt 34 can be driven at two different speeds corresponding to different scanning resolutions by switching between two configurations of the speed-change gear module 32. Therefore, the present invention not only solves the problem of insufficient torque force of the stepping motor 31 operating at high speed, but also substantially increases the scanning speed.

It should be noted that, although two deceleration ratios are provided by using the set of deceleration gear 321, 322 and the switching platform 323 in this embodiment, a person who skilled in the art may adequately modify the structure of the switching platform so as to achieve the equivalent results. Besides, the function of speed-change gear module 22 also can be accomplished by utilizing equivalent gears, and the present invention is not limited to the structure disclosed.

The above description is intended to set forth exemplary embodiment of the invention, and is not intended to limit the scope of the invention in any way. Rather, various changes may be made in the function and configuration of the elements described in the embodiment without departing from the spirit and scope of the invention. Thus, the protected scope of the present invention is as set forth in the appended claims.

I claim:

1. An image scanning apparatus comprising:
   a driving device;
   a transmission belt;
   a belt gear set connecting with and driving the transmission belt, the belt gear set including at least one gear;
   a scanning module positioned on the transmission belt; and
   a speed-change gear module comprising a first set of deceleration gear and a second set of deceleration gear;
   wherein, the first set of deceleration gear is selected to engage with the driving device so that the transmission belt is driven at a speed determined by the first set of deceleration gear while leaving the second set of deceleration gear unengaged with the driving device and the belt gear set.

2. The image scanning apparatus of claim 1, wherein the speed-change gear module comprises:
   a driving gear set connecting with and rotating with the driving device, the driving gear set including at least one gear;
   wherein the driving device drives the transmission belt at a first deceleration ratio when the first set of deceleration gear engages with the driving gear set and the belt gear set, and the driving device drives the transmission belt in a second deceleration ratio when the second set of deceleration gear engages with the driving gear set and the belt gear set.

3. The image scanning apparatus of claim 2, wherein the speed-change gear module includes a switching plafform for accommodating the first and second set of deceleration gears, the first set of deceleration gear or the second set of deceleration gear is driven to selectively engage with the driving gear set and the belt gear set by moving or rotating the switching platform.

4. The image scanning apparatus of claim 2, wherein the first set of deceleration gear includes a first input gear and a first output gear coaxial with the first input gear, and a number of teeth of the first input gear is larger than the number of teeth of the first output gear, the driving device drives the transmission belt at the first deceleration ratio when the first input gear engages with the driving gear set and the first output gear engages with the belt gear set.

5. The image scanning apparatus of claim 2, wherein the second set of deceleration gear includes a second input gear and a second output gear coaxial with the second input gear, and a number of teeth of the second input gear is larger than the number of teeth of the second output gear, the driving device drives the transmission belt at the second deceleration ratio when the second input gear engages with the driving gear set and the second output gear engages with the belt gear set.

6. The image scanning apparatus of claim 2, wherein the belt gear set includes a belt wheel, connected with the transmission belt, for driving the transmission belt to move.

7. The image scanning apparatus of claim 2, wherein the driving device includes a stepping motor.

8. The image scanning apparatus of claim 2, wherein the scanning module includes a charge coupled device (CCD).

9. The image scanning apparatus of claim 2, wherein the scanning module includes a contact image sensor (CIS).

10. The image scanning apparatus of claim 3, wherein the switching platform moves along a line defined by the axle center of the first set of deceleration gear and the axle center of the second set of deceleration gear.

11. An image scanning apparatus, comprising:
    a driving gear set;
    a first gear set;
    a scanning module driven by the first gear set, and the scanning module capable to move within the image scanning apparatus; and
    a speed-change gear module comprising a second gear set and a third gear set;
    wherein the first gear set is driven at a first speed when the second gear set is engaged with the driving gear set and the first gear set;
    wherein the first gear set is driven at a second speed when the third gear set is engaged with the driving gear set and the first gear set, the second speed is different from the first speed; and
    wherein the driving gear set rotates towards the same direction when either one of the second gear set and the third gear set is engaged with the driving gear set to keep the scanning module transmitted toward a given direction.

12. The image scanning apparatus of claim 11, wherein the first gear set is disposed between the second gear set and the third gear set, the second gear set moves toward the first gear set when a switching platform moves toward a first direction; and the third gear set moves toward the first gear set when the switching platform moves toward a second direction, and the first direction is substantially opposite to the second direction.

* * * * *